Figure 1:
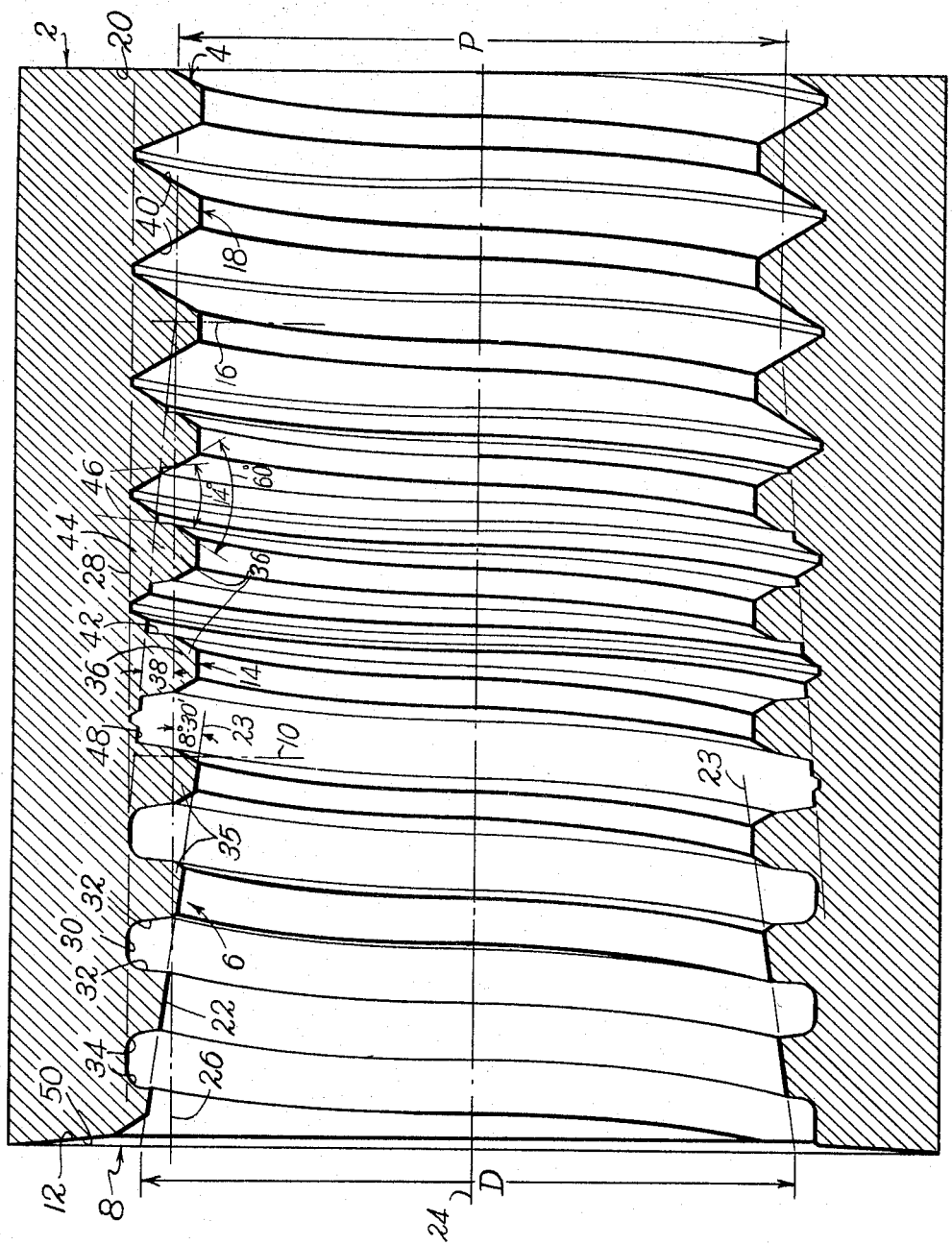

INVENTORS
Keith R. Bronson,
Charles C. Faroni.
BY Prangley, Baird, Clayton, Miller & Vogel,
Attys.

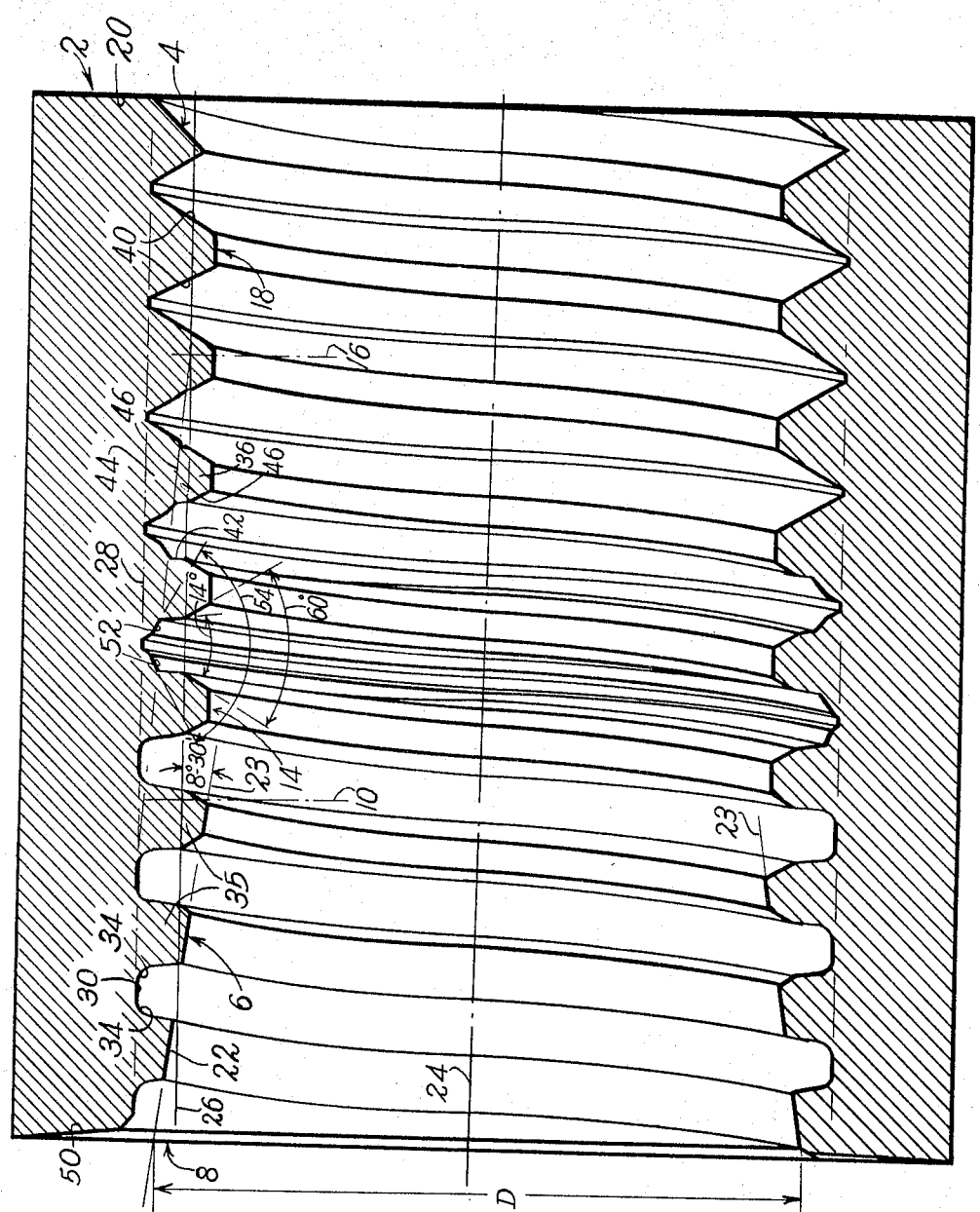

United States Patent Office  3,266,363
Patented August 16, 1966

3,266,363
NUTS WITH LOAD DISTRIBUTING THREADS
Keith R. Bronson, Arcadia, Calif., and Charles C. Faroni, Summit, N.J., assignors to Elastic Stop Nut Corporation of America
Continuation of application Ser. No. 839,335, Sept. 11, 1959. This application Apr. 21, 1964, Ser. No. 361,338
13 Claims. (Cl. 85—32)

This application is a continuation of our application Serial No. 839,335, filed September 11, 1959, now abandoned, entitled "Nuts."

This invention relates to nuts and other internally threaded work clamping articles or fasteners.

The fatigue failure of threaded metal fastenings has been under intensive study by leading scientists and design engineers for many years and based on such studies significant improvements have been made in materials and methods of manufacture of fastening devices and in bolting techniques and tools, but nevertheless such fastenings are not entirely satisfactory and industry, particularly the aircraft industry, demands more reliable fasteners. Under present conditions of dynamic loading, as encountered in many industries, and most particularly the aircraft industry, fatigue failure of bolts too frequently occurs, particularly in the case of modern high tensile strength bolts used with the best of presently known steel nuts. The relatively high temperatures under which fastening devices must operate increase the problems of reduced efficiencies, in fatigue, of bolts or bolted connections.

Lighter weight and shorter height nuts, so much needed by the aircraft industry, are limited in use by the low fatigue strength of bolted connections employing such nuts.

It is accordingly an object of this invention to provide improved nut structures and improved thread forms for nuts and similar internally threaded work clamping fasteners or devices capable of increasing the fatigue life of the bolts or bolted connections or fastener assemblies with which they are used to meet modern conditions of dynamic loading; to permit the use of shorter height nuts with consequent substantial weight saving without sacrifice in the fatigue strength of the bolted connection; to permit the utilization of higher strength alloy bolts under high tensile dynamic loading; to provide for greater reliability of threaded fastenings which must operate at elevated temperatures; and to make possible the use of harder, higher strength nuts without decreasing bolt fatigue life.

Other and further objects and advantages of the invention will be apparent from the following description when taken in conjunction with the accompanying drawings in which:

FIGURE 1 is a view in axial section through a preferred form of nut embodying the present invention, and
FIGURE 2 is a similar view of a modified form of nut also embodying the present invention.

As shown in FIGURE 1, the nut 2 is provided with an internal, straight thread 4 comprising an initial thread section 6 between the end plane 8, perpendicular to the thread axis at the work clamping, or inner face 12, and the plane 10 spaced a predetermined distance, on the order of three times the thread pitch, from plane 8. The initial section 6 merges into an intermediate or transitional thread section 14 extending between the planes 10–16. The thread section 14 merges into a final thread section 18 which may extend to the upper or outer face 20 of the nut or to a thread locking ring or insert, as in Sauer Patent 2,450,694, dated October 5, 1948, or to any desired thread locking section subjacent the upper nut face 20 or contained within a narrow, locking sleeve portion extending from the thread section 18 to the upper edge of the nut.

The upper thread section 18 consists of one or more thread convolutions of standard thread form and formed within the limits of a standard allowable major or root diameter and a standard minor or crest diameter. As illustrated, the section 18 consists of a standard 60° V-thread of the American or Unified thread form and the sections 6 and 14 comprise modifications of that same standard thread form, the major or root diameter of the thread being constant or uniform throughout the three thread sections.

The initial thread section 6 comprises a plurality of thread convolutions having bevelled, tapered, conical, countersunk inner, or crest, surfaces 22 concentric to the thread axis 24. The apex, or included, angle of the cone or countersink forming the crest surfaces 22 may be in the range of 8° to 60°, and preferably between 8° and 32°. Lines 23, indicating the wall of the cone formed by, or the countersink forming, the crest surfaces 22, intersect the work clamping nut face 12, at the plane 8 of said face, at a base diameter D which is between the thread pitch diameter P and said pitch diameter plus 1½ times the nominal thread depth for the standard thread of thread section 18. Stated mathematically, $$D > P;\ D < P \neq \frac{3h}{2}$$

where D equals the base diameter of the cone in the plane 8 of the work clamping face 12, P equals the pitch diameter of the thread and $h$ equals the nominal thread height of the internal thread, which is equal to .54127 times the pitch $p$ of the thread for the Unified thread series and equals .649519 times the pitch $p$ for the American thread series.

In the initial section 6, all portions of the thread convolutions between the pitch diameter or circle 26 and the major diameter 28, or the root surfaces 30, are formed as portions of a thread of lesser thread angle than the thread angle of the standard thread section 18. Preferably, in the thread section 6 the portions of the threads between the pitch circle and the major diameter are formed at a thread angle in the range of 0° (parallel flanks) to 29°. In the preferred embodiment shown in FIGURE 1 of the drawing, the base portions of the thread convolutions between the pitch circle and the root diameter are formed at a thread angle of 14°, i.e., the included angle of the opposed thread flanks 32 is 14°.

The flat root surfaces 30 are preferably joined to the flanks 32 by rounded or fillet surfaces 34 to provide the requisite fatigue or shear strength.

One or more thread convolutions within the section 6 have crest portions, such as indicated at 35, which extend inwardly from the pitch circle 26 and are formed at the same included thread angle as the thread of the section 18. As shown in the drawings, portions 35 are formed at a 60° thread angle.

It will be noted that within the section 6 the thread is thinner in the base area, i.e., between the pitch circle and the major diameter, than the thread of section 18 but at the pitch circle the width of the thread is the same in section 6 as in sections 14 and 18.

Thus it will be clear that as shown in FIGURE 1 of the drawings, the initial section 6 includes one or more convolutions of the base portion of a 14° countersunk or longitudinally tapered thread and one or more convolutions of a partial thread having a base portion consisting of a 14° thread and a partial crest portion consisting of a 60° countersunk or longitudinally tapered thread.

In the intermediate or transitional section 14, the thread consists of a plurality of convolutions of uniform crest or minor diameter equal to the crest or minor diameter of the thread of the standard thread section 18. Within this section the crest portions 36 inside the pitch circle are of standard 60° thread form while the base portions of the thread between the pitch circle and the root or major diameter progressivley and gradually vary from the 60° thread form, of the section 18, to the 14° thread form, of the section 6, at a rate of change determined by the predetermined tap taper angle 38 and which is on the order of 2° to 10°, depending on the nut height. Such taper intersects the pitch circle at the plane 16 and intersects the plane 10 at a base diameter which is equal to the minimum allowable major diameter of the thread, i.e., the nominal thread size. Thus within the section 14 and beginning at the pitch circle, the base portion of the thread gradually changes from a 60° to a 14° thread form, the lengths of the opposed thread flanks 40, defining the thread angle of 60°, decreasing gradually as the flank surfaces 42 of the 14° thread angle gradually increase in length until the increasing flanks 42 of the 14° thread form reach the fillets 34, and merge with the like flanks 32, of the thread section 6. The taper angle 38 is calculated to provide a minimum of one completely altered thread convolution in the section 6 and one full standard thread in section 18.

It will be noted that the the thread 4 throughout the three sections is of constant pitch and throughout sections 14 and 18 is of constant thread height and uniform thread form between the minor or crest diameter and the pitch diameter.

It will also be noted that the thread convolutions of the transitional, intermediate section 14 comprise two 60° thread form portions 36 and 44 spaced apart radially by a 14° thread form section 46. The major cone surface 48, the apex angle of which is twice the tap taper angle 38, forms an interrupted, conical, root surface 48 for the 14° thread form section 46, the length of the interruption of that surface 48, by the base portion 44 of the 60° thread section, gradually decreasing as the flanks 42 of the 14° thread form section increase in length, or height.

The fatigue life of the bolt with which the nut is used may be further increased by providing the work clamping face 12 of the nut with a concave or countersunk surface 50 inclined to the plane 8 of the work clamping face 12 at an angle which is preferably in the range of ½° to 4°. In the preferred embodiment this angle is 1°. The relieved surface 50 of the nut may be given other shapes than conical provided the axial clearance at the thread root diameter between the work clamping face 12, or the plane 8, and the relieved surface 50 is equal to the axial clearance at the thread root diameter provided by a conical surface in the angular range specified.

It will be evident from the foregoing description that applicant has provided a nut having (1) one or more thread convolutions of a first section adjacent the work clamping face of the nut in which the width of the thread in the root or base portion is substantially less than the width of the root portions of the remaining thread convolutions remote from the work clamping face, or adjacent the opposite end or face of the nut, as by forming the base portion of the nut thread at a lesser thread angle than the standard thread of the thread section remote from the work clamping face; (2) a thread which is of decreasing depth from a point spaced from the work clamping face to the work clamping face; (3) a work clamping face with a concave or relieved surface circumjacent the nut bore.

Extensive fatigue tests of nut and bolt combinations wherein the nut embodied all, or one or more, of the above described features compel the following conclusions:

(A) Standard height nuts having standard V-threads which adjacent the work clamping face are countersunk, tapered or varied in depth within the limits herein specified greatly increase the fatigue life of the bolt-nut combination;

(B) Nuts, regardless of height, in which the base portion of thread convolutions, of full or partial height, adjacent the work clamping face has been relieved by forming, or cutting back, the thread flanks to a thread angle less than the standard thread angle of the base portion of the remaining thread convolutions increase greatly the fatigue life of the bolt-nut combination;

(C) Nuts, regardless of height, when provided with a concave nut bearing surface within the limits herein specified, greatly increase the fatigue life of the bolt-nut combination and greatly reduce the "fatigue scatter" from one bolt to another;

(D) Nuts embodying features (B) and (C) above, produce the performance results indicated in the following chart in which column 1 represents the rated static strength of the bolt expressed in thousands of pounds per square inch, column 2 indicates the present rated fatigue life under dynamic loading at a given load value expressed in thousands of pounds per square inch and column 3 indicates the achieved fatigue performance of the bolt with such nuts under dynamic loading conditions at the given load values indicated in column 2 and at substantially higher loadings producing the required fatgue life indicated in column 2.

| Col. 1. Bolt Strength, K s.i. | Col. 2 Rated Fatigue Life | Col. 3 Bolt Fatigue Performance with New Nut |
| --- | --- | --- |
| 160 | 65,000 cycles at 83 K s.i. | Over 2,000,000 cycles at 83 K s.i. or 65,000 cycles at 112 K s.i. |
| 180 | 65,000 cycles at 86 K s.i. | 962,000 cycles at 86 K s.i. or 65,000 cycles at 116 K s.i. |
| 220 | 65,000 cycles at 100 K s.i. | Over 2,000,000 cycles at 100 K s.i. or 65,000 cycles at 147 K s.i. |

(E) Various other combinations of the three features and combinations of all three features increase fatigue life of the threaded portions to degrees or values which presently are immeasurable because bolt failure then occurs in the bolt head areas rather than in the threaded portions.

Nuts and other internally threaded fasteners embodying one or various combinations or all of these inventive features have the following advantages:

(1) Permit use of bolts, particularly standard high tensile bolts under substantially higher dynamic loads or for the achievement of substantially higher fatigue strength;

(2) Permit the use of shorter height and lighter weight nuts thereby making possible great reductions in the weight of the nuts employed;

(3) Permit steel nuts to be used with titanium alloy bolts in tension by making it possible for fastener manufacturers to guarantee a satisfactory bolt fatigue life for that combination;

(4) Provide fastener combinations of greater reliability and fatigue strength at elevated temperatures and capable of meeting higher temperature requirements than those which can now be met by existing fastener combinations.

A nut embodying the several features of the present invention may be formed by first tapping the nut bore with a standard tap and then re-tapping the bottom thread convolutions, i.e., the thread convolutions adjacent the work clamping face 12, with a tap which has the same pitch diameter and same major diameter as the standard tap but has a 14° included flank angle. Alternatively, the internal thread may be formed by a composite tap, the leading section of which is comprised of a standard 60° tap thread. Following this leading section, the tap thread is a continuation of the same helix as the thread of the leading section but has flank angle of 14°. The nut is threaded by inserting the tap into the bore from the work clamping face; thereafter tapping the nut in the usual manner, and terminating the tapping operation when a predetermined length of the tap has been inserted. The lead portion of the 14° thread section of the tap may be tapered, outwardly from the forward end of that section to the full 14° thread depth at the end of the section, at taper angle 38. The 60° thread formed in the nut by the 60° lead section of the tap is thus modified by the tapered and full portions of the 14° thread section as indicated in FIGURE 1 of the drawings.

The bore of the nut before tapping, or the thread adjacent the work clamping face after tapping, may be countersunk, beveled, or tapered, at the desired predetermined countersunk or taper angle and for the desired predetermined depth and until the countersunk or tapered crest of the initial thread intersects the work clamping face of the nut within the diameter ranges specified herein. Before or after tapping, the work clamping face may be countersunk or recessed circumjacent the bore of the nut by any appropriate countersinking tool.

In the form shown in FIGURE 2 of the drawings, the flanks 42, of the 14° thread form section 46 of the transitional thread section 14, do not terminate inwardly at a conical root surface, such as the root surface 48 of FIGURE 1, but are connected to the flanks of the 60° thread form base portion 44, or to the root surface of the 60° thread form, by flanks 52 formed at an included angle 54 on the order of 120°. This thread form may be secured by the use of a tap having the flanks of the 14° thread form ground inwardly from the crests at an included angle equal to the angle 54 and beginning in the plane 10, for uniformly increasing depths determined by the tap taper angle 38.

With respect to the thread form shown in FIGURE 2, it may be noted that the tap, or tap portion, for forming the thread sections 6 and 14 may have a greater useful life than the tap or tap portion for forming the sections 6 and 14 of the thread shown in FIGURE 1, although the initial tap cost may be greater.

The surprising improvements in fatigue life, and decrease in "fatigue scatter," of bolts when used in combination with nuts embodying one or more, or all, of the features of the present invention appear to result from a better and more uniform load distribution in a direction axially of the interengaged threads of the nut and bolt; a better compensation for the lengthening of the bolt and shortening of the nut under dynamic loading; a better yielding of the nut thread and consequent redistribution of the load with changes in dynamic loading; a preferential compensatory yielding of the nut thread convulsions adjacent the work clamping face thereof as dynamic loading varies and a more uniform application of the work-clamping forces.

It is apparent that many different embodiments of this invention may be made without departing from the spirit and scope thereof and, therefore, it is not intended by this description to limit the invention except as indicated in the appended claims.

Having thus described the invention, what we claim as new and desire to secure by Letters Patent is:

1. A nut having a work clamping face and an internally threaded bore, the internal thread comprising a plurality of non-locking free-spinning thread sections of equal major diameter and constant pitch throughout said sections, a first of said sections comprising at least one thread convolution of a standard thread of a standard minor diameter and a standard thread angle from root to crest, a second of said sections comprising at least one thread convolution adjacent the work clamping face of uniformly decreasing crest diameter from a value greater than the pitch diameter of said thread convolution of the first thread section to a value equal to the standard minor diameter of said standard thread convolution of the first section, said second section having thread defining flanks between the pitch circle and the major diameter of a lesser thread angle than said standard thread angle, and a third thread section having a crest surface of said standard minor diameter, flank surfaces within the pitch circle of said standard thread angle and flank surfaces between the pitch circle and the major diameter consisting of uniformly and oppositely varying lengths of the thread angle of the second section and of the standard thread angle of the first section and merging with the flank surfaces of the first and second sections, and said work clamping face having a concave, conical surface circumjacent the bore at an angle between ½° and 4° to a plane perpendicular to the axis of the thread.

2. A nut having a work clamping face and an internal thread including a first non-locking, free-spinning thread section spaced from the work clamping face and comprising at least one thread convolution of standard depth and thread angle, a second non-locking, free-spinning thread section adjacent the work clamping face and comprising at least one thread convolution of lesser thread angle, and a third non-locking, free-spinning thread section interconnecting the first and second sections and comprising a plurality of thread convolutions each comprising base and crest portions of the standard thread angle and a radially intermediate portion of the lesser thread angle.

3. A nut as described in claim 2 in which the flanks of the radially intermediate portions of the thread convolutions of the third section are joined to the flanks of the base portions of the same convolutions by axially extending surfaces tapered at an angle of 2° to 10°.

4. A nut as described in claim 2 in which the flanks of the radially intermediate portions of the thread convolutions of the third section are joined to the flanks and root surface of the same convolutions by flank surfaces at an included angle greater than the standard thread angle.

5. A nut having a work clamping face and a straight internal thread having a first thread section of a given profile and thread angle from root to crest for free-spinning-engagement with a straight external thread of the same profile and thread angle, said first section being spaced from the work clamping face, a second thread section adjacent the work clamping face and having the portion of the thread outwardly of the pitch cylinder of a lesser thread angle than the thread of the first section and the portion of the thread inwardly of the pitch cylinder of the same thread angle as the first section for free-spinning-engagement with said external thread, and a transitional thread section joining said first and second sections, said transitional thread section having the portion of the thread inwardly of the pitch cylinder of the same thread angle as the first section for free-spinning-engagement with said external thread, and having the portion of the thread outwardly of the pitch cylinder composed of an area remote from the pitch cylinder having a thread angle equal to the thread angle of the first thread section and an area adjacent the pitch cylinder having a thread angle equal to the thread angle of the second thread section and said portion of the thread outwardly of the pitch cylinder merging with said first and second thread sections.

6. A nut for use with an externally threaded member having a straight thread of standard thread angle and dimensions, said nut having a work clamping face and a straight internal thread including a first thread section of the same standard thread angle as said external thread and of standard dimensions for free-spinning-engagement therewith, said first section being spaced from the work clamping face, said internal thread including a second thread section adjacent the work clamping face of constantly decreasing minor diameter inwardly from the work clamping face, the portion of the thread of the second thread section between the pitch cylinder and the root cylinder being of lesser thread angle than the thread of the first section, said internal thread also including a transitional thread section between the first and second thread sections, the portion of the thread of the transitional thread section between the pitch cylinder and the root cylinder being composed of an area adjacent the root cylinder having a thread angle equal to the thread angle of the first thread section and an area adjacent the pitch cylinder having a thread angle equal to the thread angle of the second thread section, the thread throughout said first and second sections and said transitional thread section being of standard root diameter, and all portions of the thread of the second section and the thread of the transitional thread section inwardly of the pitch cylinder being of the standard thread angle.

7. A nut for use with an externally threaded member having a straight thread of standard profile and dimension, said nut having a work clamping face and an internal thread including a first thread section spaced from the work clamping face and comprising at least one thread convolution of standard profile and dimension for free-spinning-engagement with said external thread, a second thread section adjacent the work clamping face and comprising at least one thread convolution of uniformly varying thread depth with flank surfaces between the pitch cylinder and the root cylinder of a lesser thread angle than the thread of the first section, and a third section interconnecting the first and second sections and comprising a plurality of thread convolutions of uniform thread depth and having flank surfaces between the pitch cylinder and the root cylinder which comprise a portion remote from the pitch cylinder having a thread angle equal to the thread angle of the first thread section and a portion adjacent the pitch cylinder having a thread angle equal to the thread angle of the second thread section and merging with the flank surfaces of the thread of the first and second sections, the thread convolutions of the second and third sections being of a profile wholly within the standard profile for free-spinning-engagement with the external thread.

8. A nut as set forth in claim 7 wherein the thread convolutions of the first, second and third sections are of substantially the same root diameter.

9. A nut of predetermined nominal thread size and having a work clamping face and a straight internal thread having a portion of standard profile for said thread size and spaced from the work clamping face of the nut, the thread throughout said portion of standard profile being of standard thread angle and standard pitch and standard thread depth, said thread further having a non-locking, free-spinning modified portion adjacent the work clamping face and between the work clamping face and the thread portion of standard profile, the modified thread portion being in phase with the thread portion of standard profile and being of said standard pitch and of the standard root diameter for said nominal thread size, said modified thread portion outwardly of the pitch cylinder being of lesser thread angle than said standard thread angle and narrower than the thread of the standard thread portion at all radial locations outwardly of the pitch cylinder and of a thread profile no part of which is outside said standard profile, and said modified thread portion being more flexible for deflection under axial loading than the thread portion of standard profile.

10. A nut for use with an externally threaded member having a straight thread of standard form, said nut having a work clamping face and a straight internal thread including first and second separate thread sections, the first thread section being remote from the work clamping face and of standard thread form, the second thread section being adjacent the work clamping face and having a thread portion outwardly of the pitch cylinder of a lesser thread angle than the standard thread form of the first section, the width of the thread of the second section being less than the width of the standard thread form of the first section at any given radial distance outwardly from the pitch cylinder, the width of the thread of the second section being not greater than the width of the standard form thread of the first section at any given radial distance inwardly from the pitch cylinder whereby the thread of the second section may have free-spinning-engagement with said external thread, and the crest of the thread of the second thread section decreasing in diameter inwardly from the clamping face from a minimum radial extent more than standard to standard.

11. A nut as set forth in claim 10 wherein the thread of both sections is of the standard root diameter.

12. A nut as set forth in claim 10 wherein the section of lesser thread angle is of the same pitch as the thread section of larger thread angle.

13. A nut as set forth in claim 10 wherein the thread angle of the thread of the first section is on the order of 60°, the thread angle of the thread of the second section outwardly of the pitch cylinder is between 0° and 29°, and the thread angle of all portions of the thread of the second section inwardly from the pitch cylinder is on the order of 60°.

References Cited by the Examiner

UNITED STATES PATENTS

| | | | |
|---|---|---|---|
| 135,898 | 2/1873 | English | 85—1 |
| 1,369,156 | 2/1921 | Woodward | 151—22 |
| 2,581,690 | 1/1952 | Moehle et al. | 151—22 |
| 2,681,815 | 6/1954 | McCarn | 85—46 |

FOREIGN PATENTS

| | | |
|---|---|---|
| 616,084 | 7/1935 | Germany. |

CARL W. TOMLIN, *Primary Examiner.*

EDWARD C. ALLEN, *Examiner.*

R. S. BRITTS, *Assistant Examiner.*